(12) United States Patent
Miyazawa et al.

(10) Patent No.: US 8,576,233 B2
(45) Date of Patent: Nov. 5, 2013

(54) PROGRAM GENERATION DEVICE, PROGRAM GENERATION METHOD, AND COMPUTER-READABLE STORAGE MEDIUM

(75) Inventors: Yukou Miyazawa, Tokyo (JP); Takahiro Ohori, Tokyo (JP); Junya Takayashiki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 409 days.

(21) Appl. No.: 12/952,302

(22) Filed: Nov. 23, 2010

(65) Prior Publication Data
US 2011/0128291 A1    Jun. 2, 2011

(30) Foreign Application Priority Data
Nov. 27, 2009   (JP) ................................. 2009-269798

(51) Int. Cl.
*G06T 11/00* (2006.01)
*G06F 17/21* (2006.01)

(52) U.S. Cl.
USPC ............................ 345/471; 345/467; 715/269

(58) Field of Classification Search
None
See application file for complete search history.

(56) References Cited

U.S. PATENT DOCUMENTS

| 6,954,898 B1 | 10/2005 | Nakai et al. |
| 2008/0091784 A1 | 4/2008 | Sundstrom |
| 2008/0260257 A1* | 10/2008 | Rose ............................ 382/195 |

FOREIGN PATENT DOCUMENTS

| CN | 1282071 A | 1/2001 |
| JP | 2001092814 A | 6/2001 |
| JP | 2004-179936 | 6/2004 |
| JP | 2004-318688 | 11/2004 |
| JP | 2009-20713 | 1/2009 |

OTHER PUBLICATIONS

Kyrnin, http://web.archive.org/web/20080919135900/http://webdesign.about.com/od/fonts/a/aa062507.htm availalble since 2008.*
Notification of Refusal for JP Patent Application No. 2009-269798 dated Feb. 7, 2012.
Korean Office Action for Korean Patent No. 10 2010-0118818 dated Jun. 26, 2012.
Office Action with English Translation; issued in conjunction with Chinese Patent Application No. 201010565294.4, Dated Jul. 23, 2012.
European Search Report for EP Patent App No. 10192528.7-1527/2328097 dated May 4, 2012.
European Examination Report for EP Patent App No. 10192528.7-1527 dated May 21, 2012.
Bickmore, T.W., et al., "Digestor: device-independent access to the World Wide Web", Computer Networks and ISDN Systems, North Holland Publishing, Amsterdam, NL, vol. 29, No. 8-13, Sep. 1, 1997, pp. 1075-1082.

* cited by examiner

*Primary Examiner* — Tize Ma
*Assistant Examiner* — Yingchun He
(74) *Attorney, Agent, or Firm* — MKG, LLC (57) ABSTRACT

When a generating device generates a control program for displaying images of characters on a display screen of a mobile terminal, if a character represented in accordance with a font identity not supported by the mobile terminal is included, an item of image data representing an image that depicts the character according to the font identity is generated in advance in the generating device. When the control program is executed in the mobile terminal, a character represented in accordance with a font identity not supported by the mobile terminal can be displayed by use of the image data that has been generated in advance. With regard to a font identity supported by font data stored in the mobile terminal, an image depicting a character according to the font identity can be generated using the font data, so that the image is displayed on the mobile terminal.

6 Claims, 8 Drawing Sheets

FONT TABLE

| MODEL NAME | FONT IDENTITY ||
| --- | --- | --- |
| | FONT FAMILY | FONT SIZE |
| MODEL X | FONT A | 8pt |
| | | 12pt |
| | | 24pt |
| | | 60pt |
| | FONT B | 12pt |
| | | 24pt |
| MODEL Y | FONT A | 8pt |
| | | 12pt |
| | | 24pt |
| | | 60pt |
| | FONT C | 24pt |
| | | 48pt |
| ⋮ | ⋮ | |

ARRANGEMENT-DESIGNATING INFORMATION

| No. | CHARACTER INFORMATION | FONT INFORMATION | POSITION INFORMATION |
|---|---|---|---|
| 1 | ABC | FONT A、12pt | (x1,y1) |
| 2 | DEFG | FONT A、24pt | (x2,y2) |
| 3 | PR | FONT C、24pt | (x3,y3) |

DISPLAY-DESIGNATING INFORMATION (CHARACTER)

| No. | CHARACTER INFORMATION | FONT INFORMATION | POSITION INFORMATION |
|---|---|---|---|
| 1 | ABC | FONT A, 12pt | (x1,y1) |
| 2 | DEFG | FONT A, 24pt | (x2,y2) |

DISPLAY-DESIGNATING INFORMATION (IMAGE)

| No. | DATA NAME | POSITION INFORMATION |
|---|---|---|
| 3 | 3.jpg | (x3,y3) |

PROGRAM GENERATION DEVICE, PROGRAM GENERATION METHOD, AND COMPUTER-READABLE STORAGE MEDIUM

CROSS-REFERENCE TO RELATED APPLICATIONS

This application is based on and claims priority under 35 U.S.C. 119 from Japanese Patent Application No. 2009-269798, which was filed on Nov. 27, 2009.

BACKGROUND

1. Technical Field

The present invention relates to technology for compiling a program.

2. Related Art

In terminals such as mobile phones, an amount of data that can be stored in a memory is limited, and for this reason, a number of terminals that support many fonts for characters displayed on a display screen is relatively small. Therefore, when a terminal receives an email and content of the email contains characters to be displayed in a font that is not supported by the terminal, the font may be changed to a font supported by the terminal. However, in such a case, it often occurs that the resulting displayed content becomes different to that intended by a sender of the email, and in some cases, the content is not displayed correctly.

To address such a problem, a technology is proposed in which, when an email server sends an email to a terminal, if the terminal does not support a font designated in content of the email, the email server generates image data representing an image that depicts the content of the email to be displayed, and sends the email having the image data attached thereto to the terminal, which displays the image represented by the image data, so that content is displayed as intended by a sender of the email (see JP2004-179936A, for example).

However, in the technology disclosed in JP2004-179936A, image data representing an image that depicts all of the content to be displayed is generated, and hence, the amount of image data tends to be large. Therefore, an amount of data in the email to be sent tends to be large, resulting in a larger load in email transmission/reception and in storing of the email. Further, even when a plurality of fonts are designated in the content to be displayed and some of the fonts are supported by the terminal, the content as a whole is transmitted as image data, and thus, any fonts that are supported by the terminal are not used effectively.

SUMMARY

The present invention is made in view of the background described above, and an object of the present invention is to allow a terminal to display content containing characters as intended by a creator of the content even when a font used for some of the characters is not supported by the terminal, while allowing for effective usage of a font supported by the terminal.

To achieve the above-mentioned object, according to one aspect of the present invention, there is provided a program generation device that generates a control program for controlling content displayed on a display screen of a display device that stores font data for generating character image data representing an image of a character indicated by character information in accordance with a font identity indicated by font information, the program generation device comprising: an acquisition unit that acquires one or more font identities supported by the font data stored in the display device; a designation unit that designates characters for constituting the displayed content, font identities for the characters, and display positions of the characters; an arrangement-designating information generation unit that generates arrangement-designating information including character information that indicates the characters designated by the designation unit, font information that indicates the font identities for the characters, and position information that indicates the display positions of the characters; an image data generation unit that, based on an item of character information in the arrangement-designating information that indicates a character associated with a font identity other than the one or more font identities acquired by the acquisition unit, and an item of font information that indicates the font identity for the character, generates an item of image data representing an image that depicts the character according to its font identity; a display-designating information generation unit that generates display-designating information by replacing the item of character information and the item of font information in the arrangement-designating information that relate to the character and the font identity used in the generation of the item of image data by the image data generation unit with image-specifying information that specifies the item of image data, such that the display-designating information includes the image-specifying information and position information indicating a display position of the image relating to the image-specifying information as well as items of character information, items of font information, and items of position information in the arrangement-designating information that relate to characters for which the replacement is not performed; and a program generation unit that generates a control program for causing the display device to implement a function of causing the display screen of the display device to display an image representing a character indicated by each item of character information in the display-designating information according to the font identity indicated by the related item of font information and an image represented by the item of image data specified by the image-specifying information, at respective display positions in accordance with the display-designating information.

In a preferred embodiment of the present invention, the program generation device further comprises an alteration unit that, with regard to a character associated with a font identity that is different from and is in a predetermined relationship with one of the one or more font identities acquired by the acquisition unit, performs alteration by replacing an item of font information in the arrangement-designating information that indicates the font identity of the character with an item of font information indicating the one of the one or more acquired font identities, wherein the image data generation unit generates, based on an item of character information in the altered arrangement-designating information that indicates a character associated with a font identity other than the one or more font identities acquired by the acquisition unit, and an item of font information that indicates the font identity for the character, generates an item of image data representing an image that depicts the character according to the font identity.

In another preferred embodiment of the present invention, the alteration unit performs the alteration of an item of font information in a case where, if the control program is generated by the program generation unit and the item of image data is generated by the image data generation unit, an amount of data of the control program and the item of image data would exceed a predetermined amount of data.

In another preferred embodiment of the present invention, the alteration unit widens a range for a character associated with a font identity that is different from and is in a predetermined relationship with the one or more font identities acquired by the acquisition unit in a case where, if the control program is generated by the program generation unit and the item of image data is generated by the image data generation unit, an amount of data of the control program and the item of image data would exceed a predetermined amount of data.

In another preferred embodiment of the present invention, the program generation device further comprises a notification unit that, when there is an item of font information altered by the alteration unit, notifies the alteration.

In another preferred embodiment of the present invention, the program generation device further comprises: a storage unit that stores a correspondence table in which the one or more font identities supported by the font data stored in the display device are associated with the display device; and a specifying unit that specifies the display device, wherein the acquisition unit refers to the correspondence table to acquire the one or more font identities corresponding to the specified display device.

According to another aspect of the present invention, there is provided a non-transitory computer-readable storage medium storing a program for causing a computer to generate a control program for controlling content displayed on a display screen of a display device that stores font data for generating character image data representing an image of a character indicated by character information in accordance with a font identity indicated by font information, the program causing the computer to function as: an acquisition unit that acquires one or more font identities supported by the font data stored in the display device; a designation unit that designates characters for constituting the displayed content, font identities for the characters, and display positions of the characters; an arrangement-designating information generation unit that generates arrangement-designating information including character information that indicates the characters designated by the designation unit, font information that indicates the font identities for the characters, and position information that indicates the display positions of the characters; an image data generation unit that, based on an item of character information in the arrangement-designating information that indicates a character associated with a font identity other than the one or more font identities acquired by the acquisition unit, and an item of font information that indicates the font identity for the character, generates an item of image data representing an image that depicts the character according to its font identity; a display-designating information generation unit that generates display-designating information by replacing the item of character information and the item of font information in the arrangement-designating information that relate to the character and the font identity used in the generation of the item of image data by the image data generation unit with image-specifying information that specifies the item of image data, such that the display-designating information includes the image-specifying information and position information indicating a display position of the image relating to the image-specifying information as well as items of character information, items of font information, and items of position information in the arrangement-designating information that relate to characters for which the replacement is not performed; and a program generation unit that generates a control program for causing the display device to implement a function of causing the display screen of the display device to display an image representing a character indicated by each item of character information in the display-designating information according to the related font identity and an image represented by the item of image data specified by the image-specifying information, at respective display positions in accordance with the display-designating information.

According to yet another aspect of the present invention, there is provided a program generation method of generating a control program for controlling content displayed on a display screen of a display device that stores font data for generating character image data representing an image of a character indicated by character information in accordance with a font identity indicated by font information, the method comprising the steps of: acquiring one or more font identities supported by the font data stored in the display device; designating characters for constituting the displayed content, font identities for the characters, and display positions of the characters; generating arrangement-designating information including character information that indicates the characters designated by the designation step, font information that indicates the font identities for the characters, and position information that indicates the display positions of the characters; generating, based on an item of character information in the arrangement-designating information that indicates a character associated with a font identity other than the one or more font identities acquired by the acquisition step, and an item of font information that indicates the font identity for the character, an item of image data representing an image that depicts the character according to its font identity; generating display-designating information by replacing the item of character information and the item of font information in the arrangement-designating information that relate to the character and the font identity used in the generation of the item of image data by the image data generation step with image-specifying information that specifies the item of image data, such that the display-designating information includes the image-specifying information and position information indicating a display position of the image relating to the image-specifying information as well as items of character information, items of font information, and items of position information in the arrangement-designating information that relate to characters for which the replacement is not performed; and generating a control program for causing the display device to implement a function of causing the display screen of the display device to display an image representing a character indicated by each item of character information in the display-designating information according to the related font identity and an image represented by the item of image data specified by the image-specifying information, at respective display positions in accordance with the display-designating information.

According to the present invention, it is possible to allow a terminal to display content containing characters as intended by a creator of the content even when a font used for some of the characters is not supported by the terminal, while allowing for effective usage of a font supported by the terminal.

BRIEF DESCRIPTION OF THE DRAWINGS

Exemplary embodiments of the present invention will now be described in detail with reference to the following figures, wherein.

DETAILED DESCRIPTION

Figure 1:
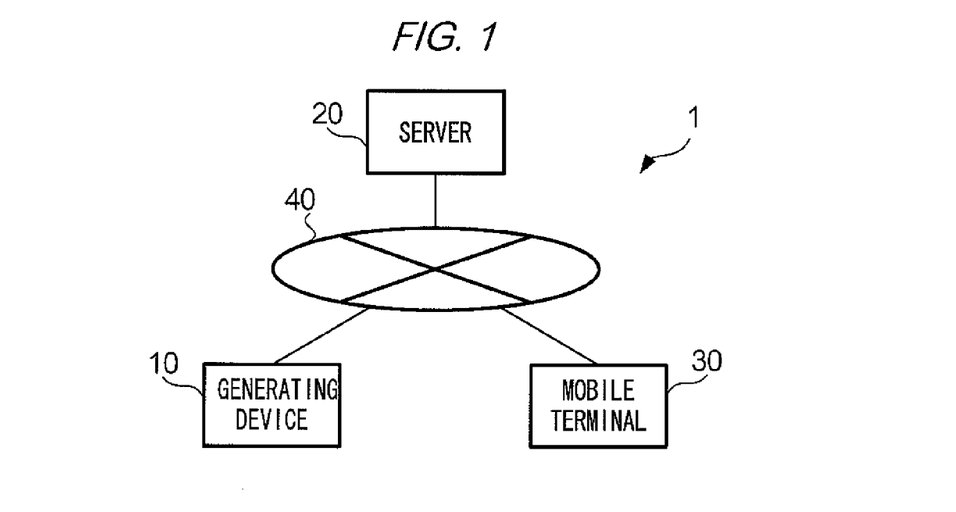
FIG. 1 is a block diagram showing a configuration of a program-providing system according to an exemplary embodiment of the present invention.

FIG. 1 is a block diagram showing a configuration of program-providing system 1 according to an exemplary embodiment of the present invention. Program-providing system 1 includes generating device 10, server 20, mobile terminal 30, and communication network 40 that connects these devices so that they can communicate with one another. Mobile terminal 30, such as a mobile phone, a PDA (Personal Digital Assistant), or the like, is an example of a display device having a display screen.

Generating device 10 generates a control program that is to be executed in mobile terminal 30 or the like, and compiles the control program together with data relating to the control program (in this example, image data or the like) to form an archive file, which is uploaded to server 20. This archive file corresponds to a JAR (Java ARchive) file used in a JAVA (registered trademark) environment, for example. It is to be noted that the control program may be any program written in a programming language, and particularly, may be a program written in a simple programming language such as a script language.

Mobile terminal 30 downloads an archive file corresponding to the model of mobile terminal 30 from among the archive files uploaded to server 20, and executes the control program included in the archive file. When the control program is executed, mobile terminal 30 displays images (such as those showing characters) on its display screen 340 (see FIG. 10) according to display-designating information included in the control program.

The font(s) that can be used for characters displayed on the display screen is determined based on the model of mobile terminal 30. It is to be noted that, although a single mobile terminal 30 is connected to communication network 40 in FIG. 1, multiple mobile terminals may be connected.

Next, explanation will be given of a configuration of generating device 10.

Figure 2:
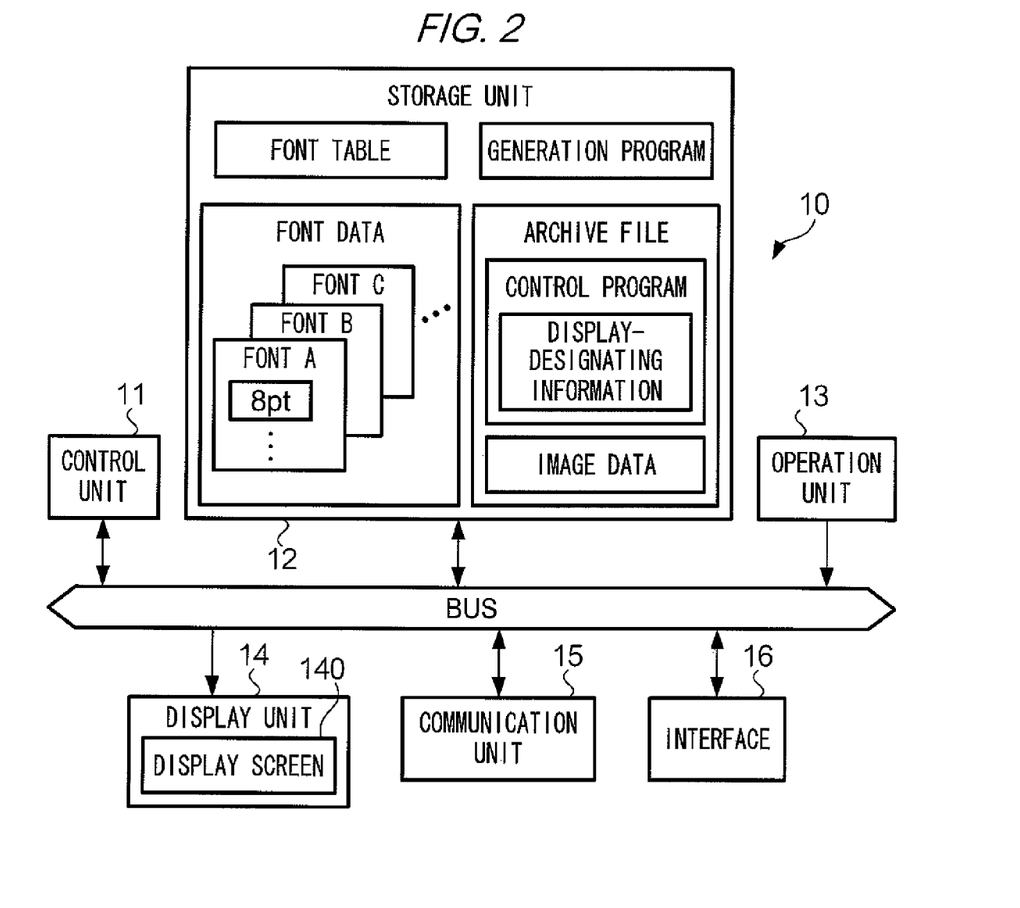
FIG. 2 is a block diagram showing a configuration of a generating device according to the exemplary embodiment of the present invention.

FIG. 2 is a block diagram showing a configuration of generating device 10 according to the exemplary embodiment of the invention. Generating device 10 includes control unit 11, storage unit 12, operation unit 13, display unit 14, communication unit 15, and interface 16, which are connected with one another via a bus.

Control unit 11 includes a CPU (Central Processing Unit), a ROM (Read Only Memory), a RAM (Random Access Memory), and other components known in the art. The CPU loads a generation program stored in storage unit 12 to the RAM and executes the same, thereby to control respective units of generating device 10 via the bus to implement a program generation function, which will be described later. Further, the CPU loads various programs stored in the ROM to the RAM and executes them to implement various functions. The RAM not only serves as a work area when the CPU processes various items of data, but also is used as a buffer memory for sets of designating information, which will be described later.

Storage unit 12 is a storage means such as a non-volatile memory or a hard disk, for example, and stores various items of information described in detail below. It is to be noted that storage unit 12 may be an external storage medium, such as a non-volatile memory, that is connected via a connection interface.

In this example, the information stored in storage unit 12 includes font data, a generation program for implementing a program generation function, an archive file(s) as described above, and a font table.

The font data contains, for each font identity applicable to characters displayed on display screen 140 of generating device 10, data necessary to display the characters according to the font identity. For example, there are items of data for respective font families (fonts A, B, C, . . . ), such as "Gothic," "Mincho," "Arial," and so on, and for each font family, there are items of data for applicable font sizes (8 pt, 10 pt, 12 pt, . . . ). In the following description, a font identity refers to a combination of a font family and a font size, and thus, for example, font identities specifying the same font A but different font sizes are considered to be different font identities. It is to be noted that a font style such as bold, oblique, and the like, a text effect such as underline, strikethrough, and the like, and/or other elements may be combined with the font family and the font size, so that different styles/text effects indicate different font identities.

In this way, when character information indicating a character and font information indicating a font identity are designated, generating device 10 can cause display screen 140 to display an image representing the character indicated by the character information according to the font identity indicated by the font information, if the data corresponding to the font identity is contained in the font data.

An archive file is constituted of a control program generated by the program generation function and image data to be used by the control program, where the control program is compiled together with the image data. The control program includes display-designating information that specifies a character, a font for the character, a display position of an image represented by image data, and so on. The image data and the display-designating information will be described later.

Figure 3:
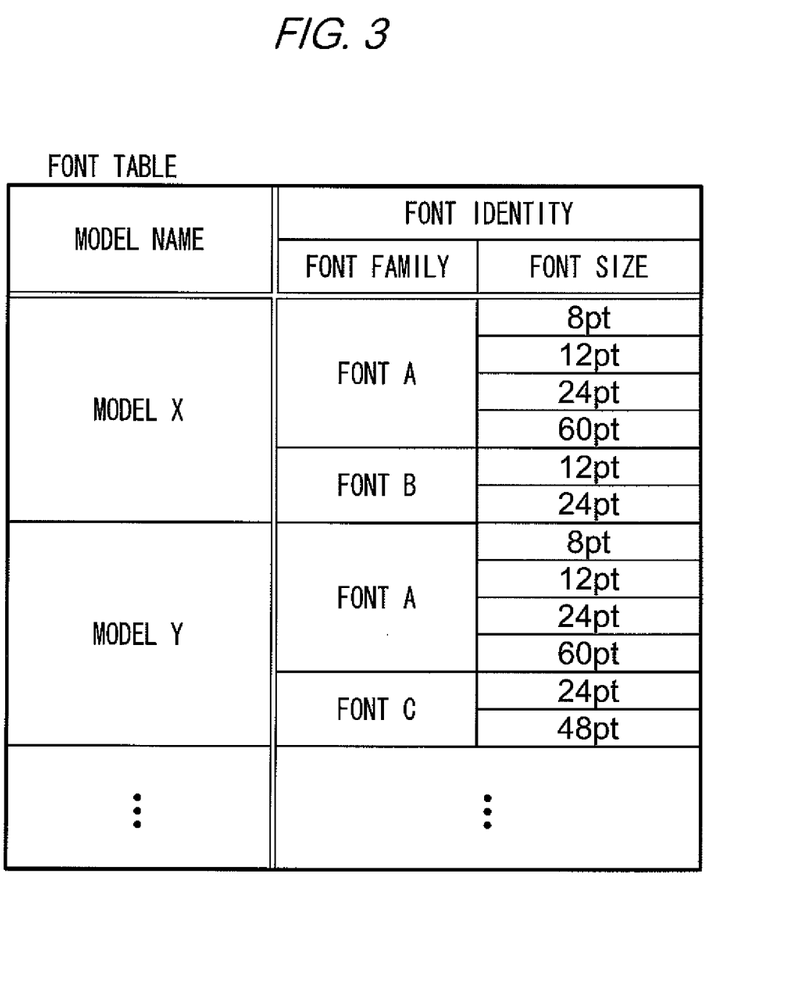
FIG. 3 is a diagram for explaining a font table stored in the generating device according to the exemplary embodiment of the present invention.

FIG. 3 is a diagram for explaining a font table. The font table is a table that shows which font identities are applicable to characters in each model of mobile terminal 30. That is, the font table shows font identities corresponding to data contained in the font data stored in storage unit 32 (see FIG. 10) of mobile terminal 30 of each model. For example, the table shows that, with regard to mobile terminal 30 of model X, items of data for font A (with font sizes 8 pt, 12 pt, 24 pt, and 60 pt) and items of data for font B (with font sizes 12 pt and 24 pt) are contained in the font data, so that when a character and a font identity are designated, an image representing the character in accordance with the designated font identity can be displayed on display screen 340, so long as the designated font identity is one of the font identities shown in the font table. It is to be noted that the font table may be stored in an external device such as a server 20.

Operation unit 13 includes an input device such as a keyboard, a mouse, or the like, and in response to an operation of the input device by a user, outputs data representing content of the operation to control unit 11. By operating the input device, a user can designate and determine a character to be displayed on display screen 140, a font identity, a display position, and the like, designate a model of mobile terminal 30 corresponding to the control program to be generated, and make various kinds of settings during execution of the program generation function.

Display unit 14 is a display device, such as a liquid crystal display, having display screen 140 for displaying an image. Display unit 14 causes display screen 140 to display an image according to control of control unit 11. For example, when the program generation function is implemented, content displayed on display screen 140 is controlled by display control unit 111, as will be described later. Further, under the control of control unit 11, various modes of display such as display in response to a user's operation, display of a menu, display of a setting screen, and the like, may be carried out.

It is to be noted that, though generating device 10 includes display unit 14 in the illustrated embodiment, a display device having a display screen may be connected via an interface.

Communication unit 15 communicates with server 20 via communication network 40 under control of control unit 11, and in this example, uploads an archive file to server 20.

Interface 16 is a connection terminal or the like for a wired connection with an external device for transmission/reception of a variety of information with the external device. The foregoing is a description of the configuration of generating device 10.

Next, explanation will be given of a program generation function implemented by execution of a generation program by control unit 11 of generating device 10. The program generation function is a function of generating a control program to be executed in mobile terminal 30, and generating an archive file in which the control program and data used with the control program are compiled. It is to be noted that each functional unit of the program generation function, which unit will be described below, may be provided as hardware.

Figure 4:
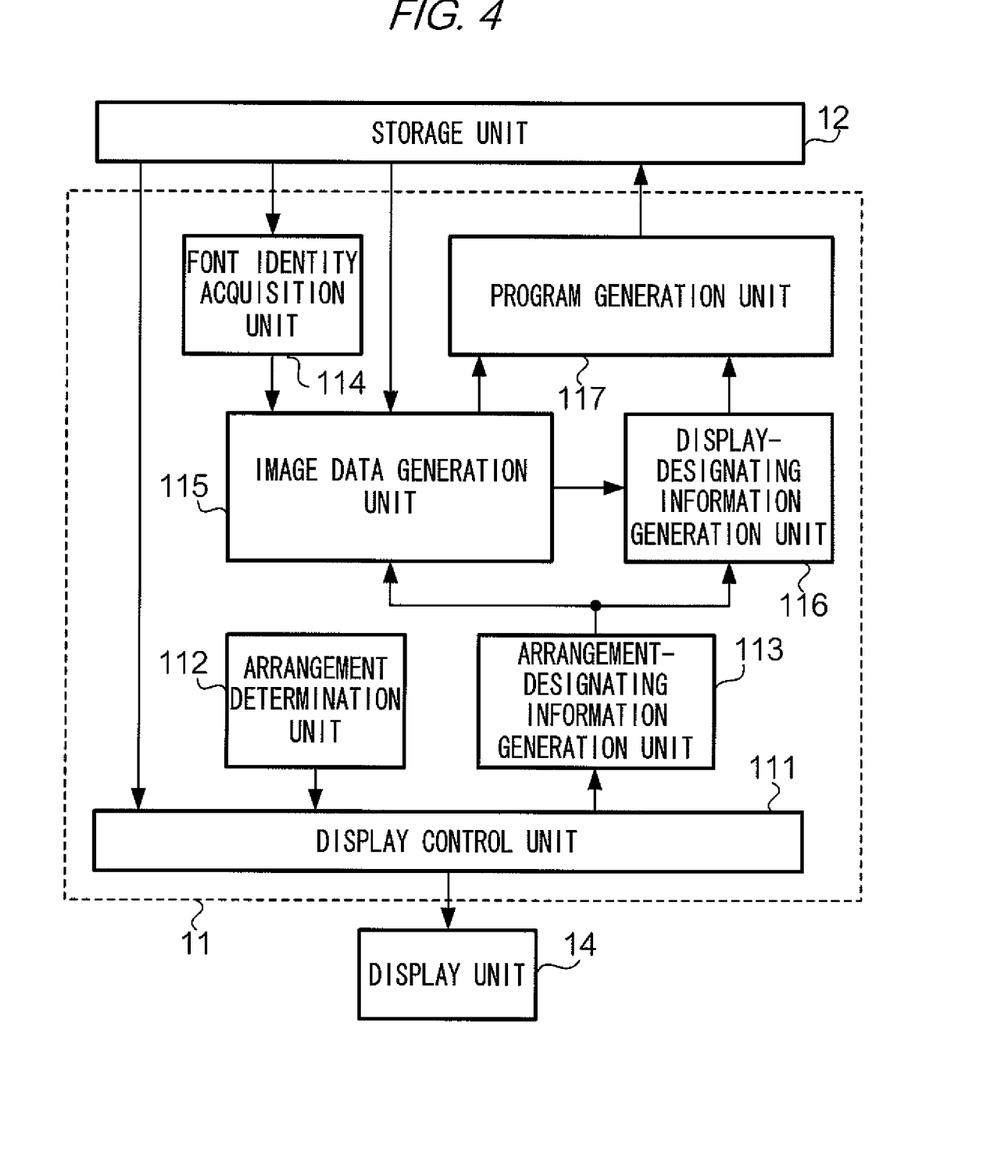
FIG. 4 is a block diagram showing a program generation function according to the exemplary embodiment of the present invention.

FIG. 4 is a block diagram showing a program generation function according to the exemplary embodiment of the present invention. To carry out the program generation function, there are used display control unit 111, arrangement determination unit 112, arrangement-designating information generation unit 113, font identity acquisition unit 114, image data generation unit 115, display-designating information generation unit 116, and program generation unit 117.

As is described above, display control unit 111 controls content displayed on display screen 140 of display unit 14. This displayed content is a setting screen for allowing a user to set content that will be displayed on the display screen of mobile terminal 30 when a generated control program is executed in mobile terminal 30, and an example of which displayed content is shown in FIG. 5.

Figure 5:
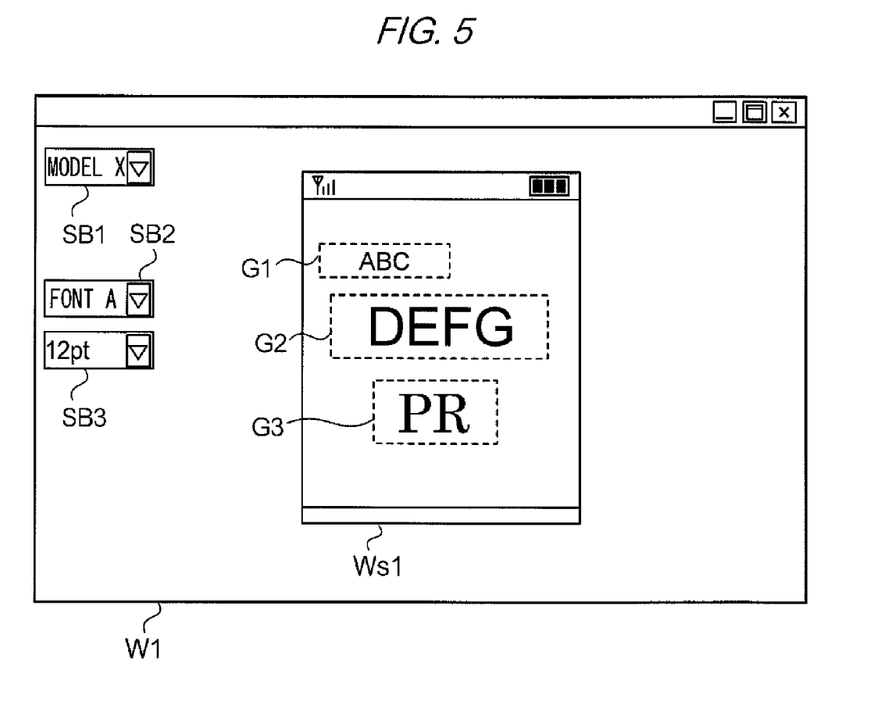
FIG. 5 is a diagram for explaining content caused to be displayed by the program generation function according to the exemplary embodiment of the present invention.

FIG. 5 is a diagram for explaining content caused to be displayed by the program generation function according to the exemplary embodiment of the present invention. As shown in FIG. 5, display control unit 111 causes display screen 140 to show window W1 that is used in the program generation function. In window W1, there are shown selection boxes SB1 SB2, and SB3, sub-window Ws1, and so on.

Selection box SB1 is used when a user designates a model of mobile terminal 30 corresponding to the control program to be generated. Selection box SB1 is a pull-down menu for allowing a user to select a model from pre-registered models. It is to be noted that a screen size (e.g., 480×640) representing a number of pixels of display screen 340 of mobile terminal 30 is pre-registered for each model, and upon selection of a model from selection box SB1 by an operation of operation unit 13 by a user to designate the model, sub-window Ws1 corresponding to the screen size of display screen 340 of mobile terminal 30 of the designated model is displayed.

Selection boxes SB2 and SB3 are pull-down menus used when a user specifies respectively a font family and a font size of a character(s) to be displayed in sub-window Ws1, and are adapted to allow a user to choose a font family and a font size in accordance with the font identities supported by the data contained in the font data stored in storage unit 12.

Sub-window Ws1 is a display for setting content to be displayed on display screen 340 of mobile terminal 30. As is described in the foregoing, sub-window Ws1 is displayed to correspond to the screen size of display screen 340 of mobile terminal 30 of the designated model.

When a user operates operation unit 13 to arrange characters in this sub-window Ws1, and uses selection boxes SB2 and SB3 to determine a font identity for each arranged character, display control unit 111 converts each character into an image representing the character according to the determined font identity based on the character and the font data, and displays the image. At this time, characters may be arranged by use of a text box or the like. In this way, a user can set content to be displayed on display screen 340 of mobile terminal 30.

In this example, it is assumed that a user has arranged characters and set the font identities therefor such that images G1, G2, and G3 are displayed in sub-window Ws1, as shown in FIG. 5. Specifically, image G1 includes characters "ABC" with the font identity "font A (Gothic), 12 pt," image G2 includes characters "DEFG" with the font identity "font A (Gothic), 24 pt," and image G3 includes characters "PR" with the font identity "font C (Century), 24 pt."

It is to be noted here that display control unit 111 may not change the size of sub-window Ws1 for different models of mobile terminal 30 having different sizes of display screen 340, if the aspect ratio of each screen is the same. In such a case, the proportion between display screen 340 and sub-window Ws1 may not be 1:1, and therefore, when a font size is designated, display control unit 111 adjusts the font size of a character displayed in sub-window Ws1 in accordance with the proportion. Thus, in this example, the font size designated by a user through selection using selection box SB3 is a size of a character displayed on display screen 340 of mobile terminal 30, and not a size of a character displayed on display screen 140 of generating device 10.

It is to be noted that, when sub-window Ws1 is displayed on display screen 140 such that the size (a number of pixels) of display screen 340 and the size (a number of pixels) of sub-window Ws1 are the same, the proportion therebetween is 1:1, and thus, it is not necessary to convert the display according to the proportion.

Then, upon receipt of instruction of an arrangement determination from arrangement determination unit 112, display control unit 111 outputs to arrangement-designating information generation unit 113 information for designating an arrangement, such as characters displayed in sub-window Ws1, font identities, and display positions.

Explanation will be continued referring again to FIG. 4. Arrangement determination unit 112 provides an instruction of arrangement determination to display control unit 111, as described above, in response to a user's operation of operation unit 13 to determine the arranged display content, so that information for designating an arrangement, such as characters displayed in sub-window Ws1, font identities, and display positions, is forwarded to arrangement-designating information generation unit 113.

Upon acquisition from display control unit 111 of information for designating an arrangement, such as characters displayed in sub-window Ws1, font identities, and display positions, arrangement-designating information generation unit 113 generates arrangement-designating information based on the acquired information, and outputs the arrangement-designating information to image data generation unit 115 and display-designating information generation unit 116. The arrangement-designating information is information that designates an arrangement, such as characters displayed in sub-window Ws1, font identities, and display positions. Detailed explanation will be given of the arrangement-designating information with reference to FIGS. 6 and 7.

Figure 6:
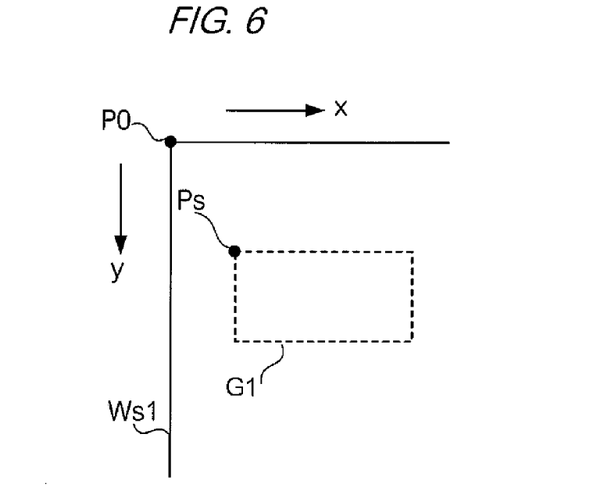
FIG. 6 is a diagram for explaining position information according to the exemplary embodiment of the present invention.

FIG. 6 is a diagram for explaining a definition of a coordinate indicated by each item of arrangement-designating information. As shown in FIG. 6, a coordinate indicated in each item of arrangement-designating information is obtained with the upper left position of the screen area of sub-window Ws1 being origin P0, the rightward direction being the positive x-direction, and the downward direction being the positive y-direction. Also, the upper left position of an image located in sub-window Ws1 is display position Ps of the image. This is represented by a number of pixels when the image is displayed on display screen 340 of mobile terminal 30.

Figure 7:
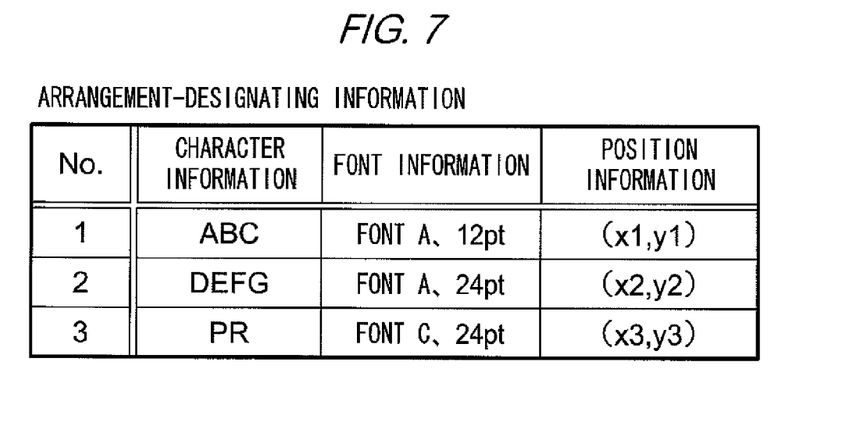
FIG. 7 is a diagram for explaining arrangement-designating information according to the exemplary embodiment of the present invention.

FIG. 7 is a diagram for explaining arrangement-designating information. The arrangement-designating information includes a sequential number (No.) assigned to each of the displayed character strings, together with a correspondence relationship between "character information" indicating the character string, "font information" indicating a font identity for the character string, and "position information" indicating an arrangement position of the character string.

Images G1, G2, and G3 shown in FIG. 5 are images corresponding to the sequential numbers ("No.") "1," "2," and "3," respectively, and for the image assigned the sequential number ("No.") "3," it is set forth that "character information" is "PR," "font information" is "font C, 24 pt," and "display position" is "(x3, y3)."

It is to be noted here that a character string represents a group of characters for which the same font identity is set; and if the same font identity is set for adjacent characters, they are treated as belonging to the same character string. It is to be noted, however, that a sequential number may be assigned to each character, instead of each character string, so that each character may be associated with font information and position information.

In the following, explanation will be continued assuming that the arrangement-designating information shown in FIG. 7 has already been generated by arrangement-designating information generation unit 113.

Explanation will be continued referring again to FIG. 4. Font identity acquisition unit 114 refers to the font table stored in storage unit 12 to acquire font identity information indicating the font identities associated with the model of mobile terminal 30 designated as described in the foregoing, and outputs the acquired information to image data generation unit 115. In this example, it is assumed that model X has been designated. Accordingly, the font identities indicated by the font identity information forwarded to image data generation unit 115 are "font A, 8 pt," "font A, 12 pt," . . . "font B, 24 pt."

It is to be noted that in a case where the font table is stored in server 20, font identity acquisition unit 114 may refer to that font table.

Image data generation unit 115 acquires the arrangement-designating information and the font identity information, and performs an image data generation process using this acquired information to output the generated image data to program generation unit 117 while providing comparison result information to display-designating information generation unit 116. Explanation will be given below of the image data generation process with reference to FIG. 8.

Figure 8:
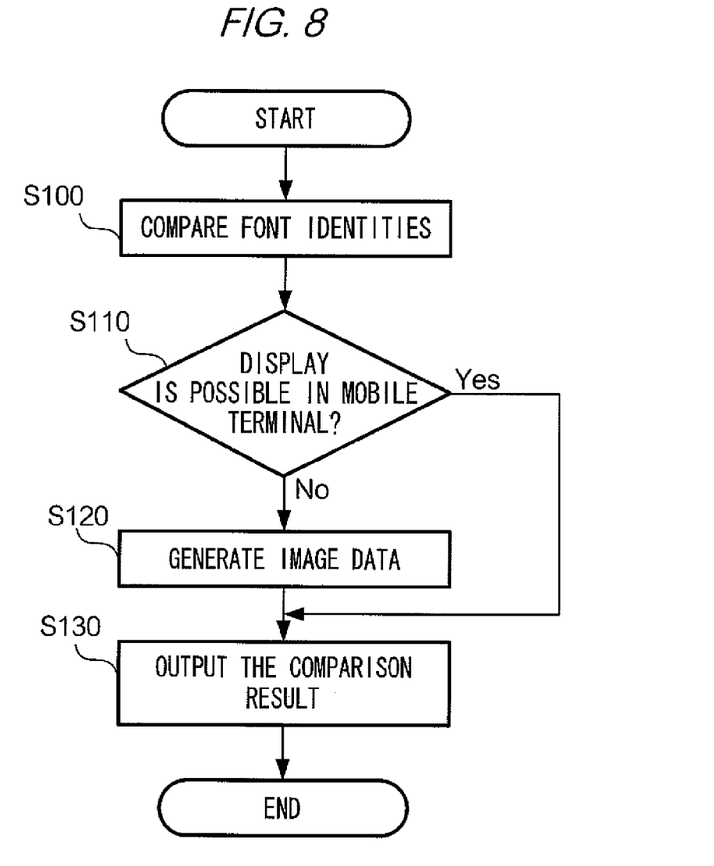
FIG. 8 is a flowchart showing an image data generation process according to the exemplary embodiment of the present invention.

FIG. 8 is a flowchart showing the image data generation process. First, image data generation unit 115 compares the font identities indicated by the font identity information with font identities indicated by the font information in the arrangement-designating information (step S100).

If it is found as a result of the comparison that there is a font identity indicated by the font information in the arrangement-designating information that is not included in the font identities indicated by the font identity information, image data generation unit 115 determines that the font identities indicated by the font information in the arrangement-designating information include a font identity that is not supported by the font data stored in mobile terminal 30 of model X (hereinafter referred to as "font identity not supported by mobile terminal 30"), and thus determines that display of an image representing a character in accordance with the font identity cannot be performed in mobile terminal 30 of model X (step S110; No).

In a case where such a determination is made, image data generation unit 115 generates an item of image data representing the image by using the font data stored in storage unit 12 (step S120), and outputs the item of image data to program generation unit 117.

To show an example of such a case, an image representing the character information "PR" corresponding to the sequential number "3" in the arrangement-designating information according to the font identity "font C, 24 pt" cannot be generated in mobile terminal 30 of model X for display on display screen 340 because of lack of font data for font C. Therefore, image generation unit 115 reads out font data for "font C, 24 pt" from storage unit 12 to generate an item of image data representing an image that depicts "PR" with "font C, 24 pt." At this time, the name of the item of image data may be determined as "3.jpg" corresponding to the sequential number ("No."), for example.

Then, image data generation unit 115 outputs comparison result information, which indicates the result of the comparison, to display-designating information generation unit 116 (step S130). This comparison result indicates the sequential number "No." of the font identity not supported by mobile terminal 30 among the font identities indicated by the font information in the arrangement-designating information. Accordingly, in the aforementioned example, the comparison result information output from image data generation unit 115 indicates "3."

At this time, image data generation unit 115 may output comparison result information including the name of the generated item of image data associated with the sequential number "No." However, this association with the name of the item of image data can be omitted if the name of the item of image data is determined to indicate the sequential number, as is described in the foregoing.

On the other hand, in a case where it is determined that the font identities indicated by the font information in the arrangement-designating information do not include a font identity that is not supported by mobile terminal 30 (step S110; YES), image data generation unit 115 outputs comparison result information indicating such a determination (for example, indicating "0," which is not used as an assignable sequential number ("No.")) (step S130). For example, if mobile terminal 30 of model Y is designated instead of mobile terminal 30 of model X, the font identities indicated by the font information in the arrangement-designating information shown in FIG. 7 are all supported by mobile terminal 30. The foregoing is a description of the image data generation process.

Explanation will be continued referring again to FIG. 4. Display-designating information generation unit 116 acquires the arrangement-designating information output from arrangement-designating information generation unit 113 and the comparison result information output from image data generation unit 115, and based on the acquired information, generates display-designating information, which is forwarded to program generation unit 117.

Figure 9:
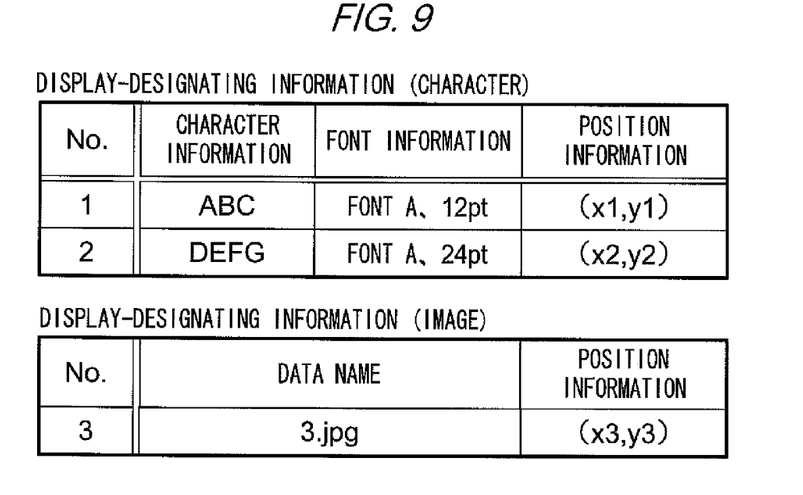
FIG. 9 is a diagram for explaining display-designating information according to the exemplary embodiment of the present invention.

FIG. 9 is a diagram for explaining the display-designating information. The display-designating information is constituted of display-designating information (character) that sets forth the correspondence relationships between "character information," "font information," and "position information" which are unchanged from those set forth in the arrangement-designating information, and display-designating information (image) that sets forth a correspondence relationship between each "data name," which is an example of image-specifying information that specifies an item of image data, and "position information" that indicates a position at which an image represented by the item of image data is arranged.

Display-designating information generation unit 116 replaces "character information" and "font information" corresponding to the sequential number "No." indicated by the comparison result information with the name of the item of image data ("data name") generated by image data generation unit 115, thereby to generate the display-designating information. Specifically, the display-designating information (image) is generated by extraction of a set of information assigned a sequential number "No." corresponding to the replaced information, while the display-designating information (character) is generated by extraction of a set of information assigned a sequential number "No." whose corresponding information has not been replaced.

As is described above, the display-designating information is obtained from the arrangement-designating information by replacing "character information" and "font information" relating to the character(s) and the font identity used for generating an item of image data in image data generation unit 115 with a "data name," which serves as image-specifying information that specifies the generated item of image data.

The display-designating information shown in FIG. 9 is generated from the arrangement-designating information and the comparison result information shown in the foregoing example. Namely, for sequential numbers ("No.") "1" and "2," there is generated display-designating information (character) having the same content as that of the arrangement-designating information. On the other hand, for sequential number ("No.") "3," there is generated display-designating information (image) in which the "character information" and the "font information" in the arrangement-designating information is replaced with a "data name," which is "3.jpg" in the illustrated example.

Explanation will be continued referring again to FIG. 4. Program generation unit 117 generates a control program for use in mobile terminal 30 of the designated model by using the image data output from image data generation unit 115 and the display-designating information output from display-designating information generation unit 116, and compiles the control program together with the image data to generate an archive file, which is stored in storage unit 12. This archive file includes information for identifying the designated model. After the archive file is stored in storage unit 12, the stored archive file is uploaded to server 20 by control of control unit 11 or in response to an instruction input via operation unit 13 by a user.

The control program generated by program generation unit 117 includes a program that controls content displayed on display screen 340 of mobile terminal 30, which has been determined as described above. The control program also includes display-designating information that indicates characters constituting content to be displayed, font identities for the characters, images, and their display positions. The foregoing is a description of the program generation process. Next, explanation will be made of a configuration of mobile terminal 30.

Figure 10:
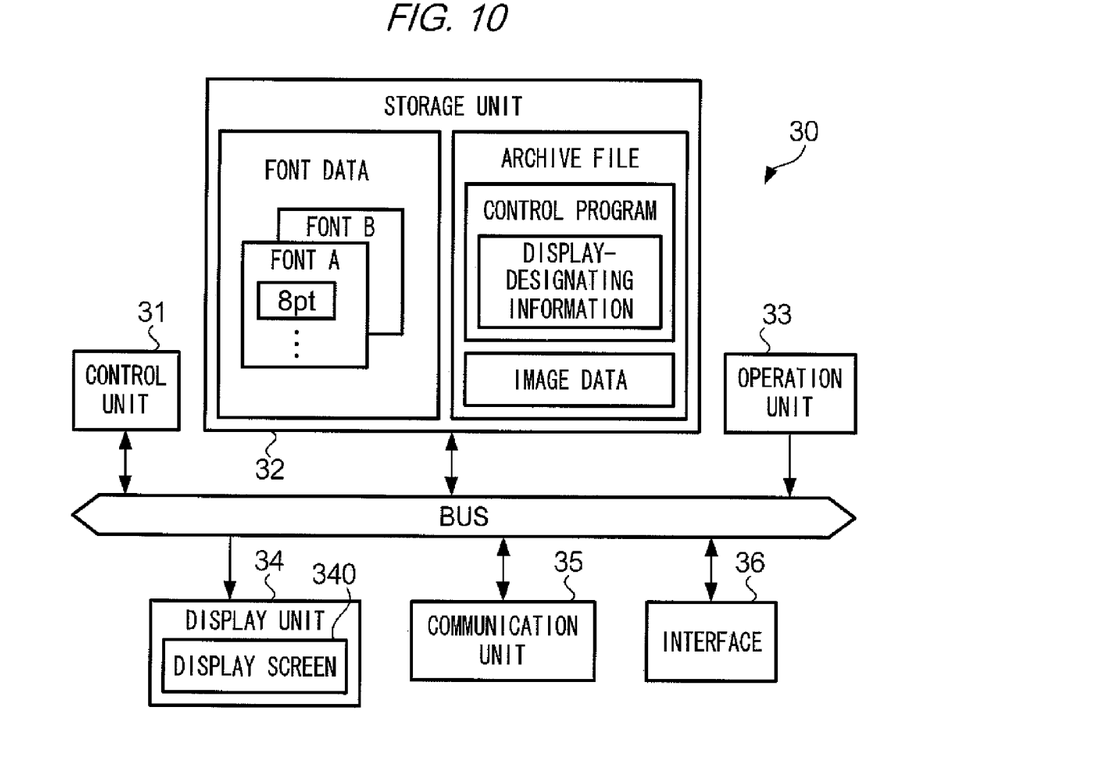
FIG. 10 is a block diagram showing a configuration of a mobile terminal according to the exemplary embodiment of the present invention.

FIG. 10 is a block diagram showing a configuration of mobile terminal 30 according to an exemplary embodiment of the invention. Mobile terminal 30 includes control unit 31, storage unit 32, operation unit 33, display unit 34, communication unit 35, and interface 36, which are connected with one another via a bus.

Control unit 31 includes a CPU, a ROM, a RAM, and other components known in the art. The CPU loads a control program in an archive file stored in storage unit 32 to the RAM and executes the same, thereby to control respective units of mobile terminal 30 via the bus to implement a function of causing display screen 340 to display content according to the display-designating information. Further, the CPU loads various programs stored in the ROM to the RAM and executes them to implement various functions. The RAM serves as a work area when the CPU processes various items of data.

Storage unit 32 is a storage means such as a non-volatile memory or a hard disk, for example, and stores various items of information described in detail below. It is to be noted that storage unit 32 may be an external storage medium, such as for example, a non-volatile memory, that is connected via a connection interface. In this example, the information stored in storage unit 32 includes font data and an archive file(s) downloaded from server 20.

The font data contains data relating to font identities that can be applied to characters displayed on display screen 340 of mobile terminal 30. Thus, upon acquisition of character information and font information indicating a font identity supported by the font data, control unit 31 can generate character image data representing an image that depicts the character indicated by the character information according to the font identity. The font table of the aforementioned generating device 10 serves to set forth the correspondence relationship between the models of mobile terminal 30 and the font identities supported by the data contained in the font data stored in storage unit 32 of mobile terminal 30.

Operation unit 33 includes an input device such as a panel of buttons, and in response to an operation of the input device by a user, outputs data representing content of the operation to control unit 31. By operating the input device, a user can instruct execution of a control program in an archive file, and make various kinds of settings.

Display unit 34 is a display device, such as a liquid crystal display, having display screen 340 for displaying an image. Display unit 34 causes display screen 340 to display an image under control of control unit 31. As is described in the foregoing, when a control program in an archive file is executed, display unit 34 is controlled by control unit 31 such that display on display screen 340 is performed according to the display-designating information. Further, under the control of control unit 31, various modes of display such as display in response to a user's operation, display of a menu, display of a setting screen, etc. may be carried out.

Figure 11:
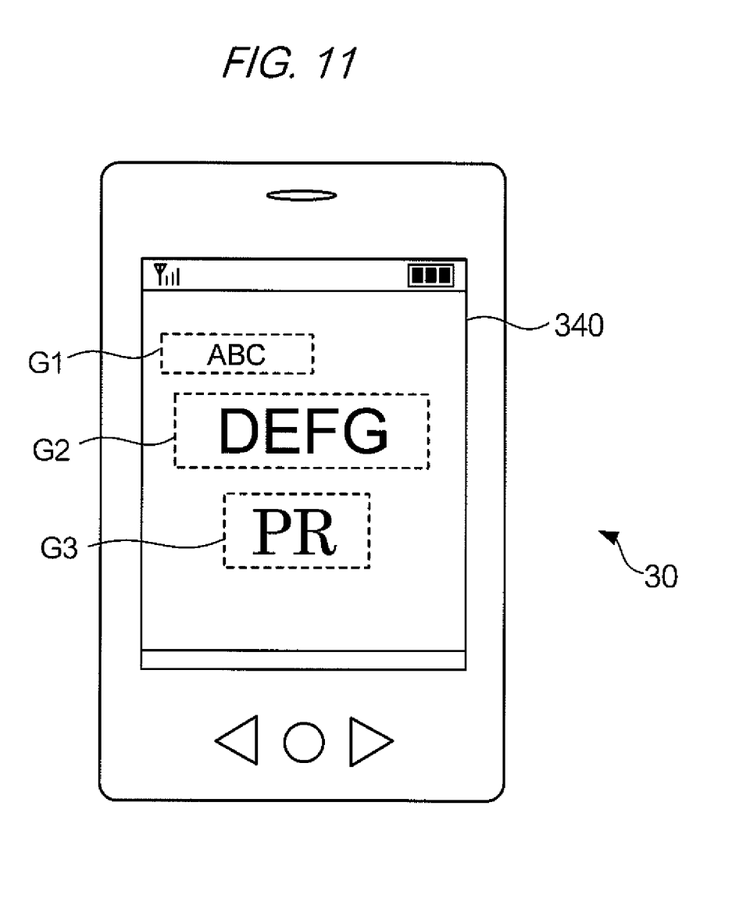
FIG. 11 is a diagram for explaining content displayed on the mobile terminal according to the exemplary embodiment of the present invention.

FIG. 11 is a diagram for explaining content displayed on mobile terminal 30. When mobile terminal 30 executes the control program in the archive file generated by generating device 10 in the example described in the foregoing to cause display screen 340 to display images according to the display-designating information shown in FIG. 9, content is displayed as shown in FIG. 11.

With regard to images G1 and G2, the font data stored in storage unit 32 is used to generate respective items of character image data each representing an image that depicts a character indicated by "character information" in the display-designating information (character) according to the font identity indicated by "font information," and the image represented by each generated item of character image data is displayed at a position indicated by "position information." On the other hand, with regard to image G3, control unit 31 uses the image data "3.jpg" in the archive file, which is specified by "data name" in the display-designating information (image), to cause an image represented by the image data to be displayed at a position indicated by "position information."

Explanation will be continued referring again to FIG. 10. Communication unit 35 communicates with server 20 via communication network 40 under control of control unit 31, and in this example, downloads an archive file from server 20.

Interface 36 is a connection terminal or the like for a wired connection with an external device for transmission/reception of a variety of information with the external device. The foregoing is a description of the configuration of mobile terminal 30.

As is described in the foregoing, when generating device 10 according to an exemplary embodiment of the present invention generates a control program for displaying images of characters on display screen 340 of mobile terminal 30, if a character represented in accordance with a font identity not supported by mobile terminal 30 is included, an item of image data representing an image that depicts the character according to the font identity is generated in advance in generating device 10. When the control program is executed in mobile terminal 30, a character represented in accordance with a font identity not supported by mobile terminal 30 can be displayed by use of the image data that has been generated in advance. With regard to a font identity supported by mobile terminal 30 (a font identity corresponding to the font data stored in storage unit 32), an image depicting a character according to the font identity can be generated by use of the font data, so that the image is displayed on mobile terminal 30.

Thus, when content containing characters is displayed on terminal 30, even when a font identity for some of the characters is not supported by terminal 30, it is possible to cause the content to be displayed on the display screen of mobile terminal 30 as intended by a creator of the content, while allowing for effective usage of data for a font identity supported by the terminal.

An exemplary embodiment of the present invention has been described in the foregoing. However, the present invention may be practiced in a variety of embodiments, as described below.

In the foregoing exemplary embodiment, when there are characters using font identities not supported by mobile terminal 30, the character information and the font information relating to each of these characters are replaced with an item of information specifying image data. However, of the unsupported font identities, one that is close to a font identity supported by mobile terminal 30 may be changed to this supported font identity, thereby to reduce an amount of image data generated. In the following, explanation will be given of a configuration of a program generation function in such a case.

Figure 12:
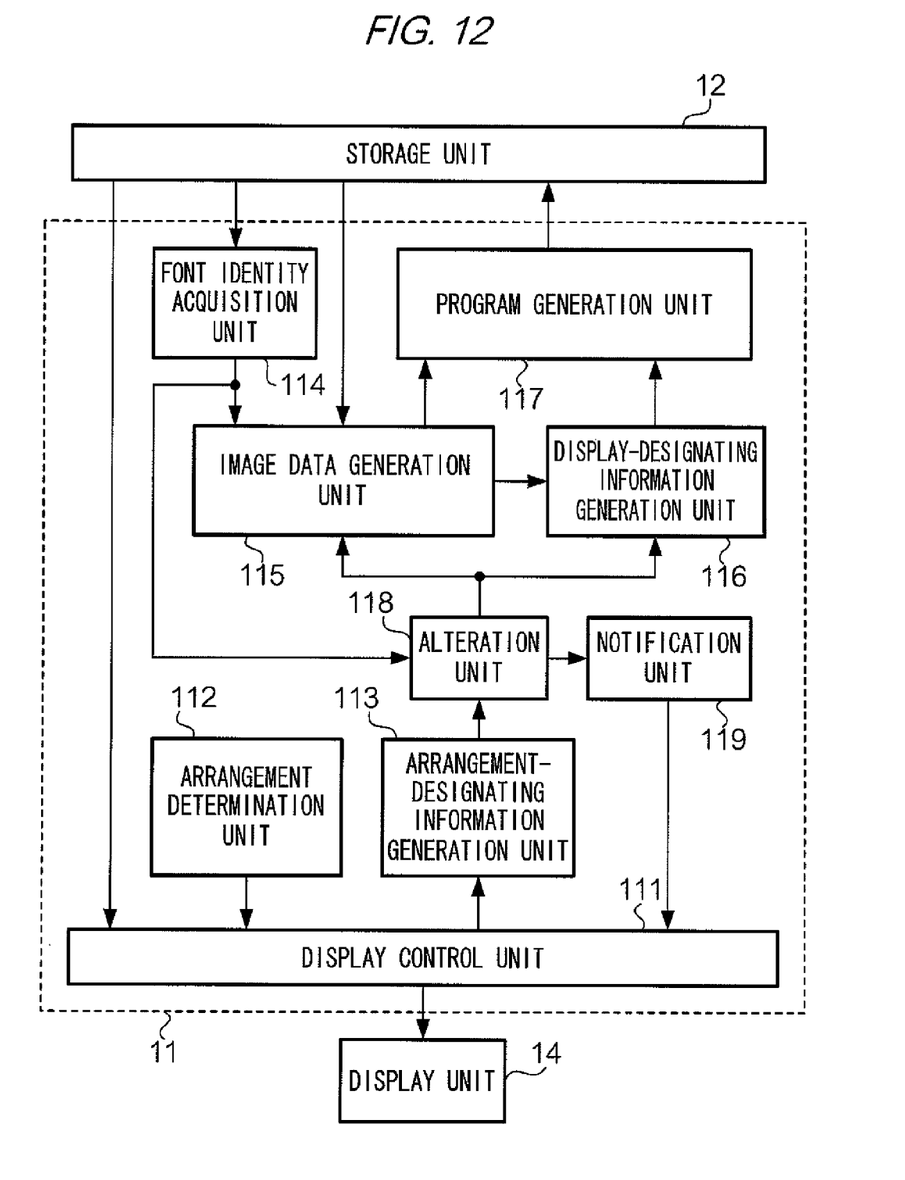
FIG. 12 is a block diagram showing a program generation function according to Modification 1 of the present invention.

FIG. 12 is a block diagram showing a program generation function according to one embodiment. The program generation function according to this embodiment uses alteration unit 118 and notification unit 119 in addition to the program generation function of the foregoing embodiment.

Alteration unit 118 compares the font identity information output from font identity acquisition unit 114 with the arrangement-designating information output from arrangement-designating information generation unit 113, and if the arrangement-designating information includes a font identity not supported by mobile terminal 30 and this unsupported font identity is in a close relationship with a font identity indicated by the font identity information, alters the content of the arrangement-designating information such that the unsupported font identity is replaced with the font identity in a close relationship with the unsupported font identity, and outputs the altered arrangement-designating information to image data generation unit 115 and display-designating information generation unit 116. Image data generation unit 115 and display-designating information generation unit 116, having acquired the output arrangement-designating information, perform the processes described above with regard to the exemplary embodiment.

It is to be noted here that the "close relationship" is a predetermined relationship defined in alteration unit 118. For example, if a font size of an unsupported font identity in the font information of the arrangement-designating information can be made equal to a font size of a font identity indicated by the font identity information by increasing or decreasing the font size of the unsupported font identity by 1 pt, these font identities may be considered to be in a close relationship.

Concretely, if "font information" in the arrangement-designating information is "font A, 9 pt," the font identity is not supported by mobile terminal 30 of model X. However, this font identity is in a close relationship with "font A, 8 pt" included in the font identity information relating to model X, and thus, alteration unit 118 replaces "font A, 9 pt" with "font A, 8 pt" in the arrangement-designating information. It is to be noted that a close relationship may be defined not only between font sizes but also between font families For example, two font families whose difference is that one is monospaced and the other is proportional may be considered to be in a close relationship.

As described in the foregoing, in a case where the font information in the arrangement-designating information indicates a font identity that is in a predetermined close relationship with a font identity indicated by the font identity information, alteration unit 118 performs alteration by replacing this font identity in the arrangement-designating information with the closely-related font identity indicated by the font identity information.

When there is a candidate for alteration, alteration unit 118 informs notification unit 119 of it before performing the alteration. Then, in response to the information, notification unit 119 controls display control unit 111 to cause display screen 140 to show a display for notifying that there is a candidate for alteration of font identity and for prompting a user to alter the font identity into the candidate font identity. It is to be noted that the notification is not limited to that using display screen 140, and may be output as a sound if a loudspeaker is provided.

If a user operates operation unit 13 to indicate acceptance of the alteration, alteration unit 118 performs the alteration and outputs the altered arrangement-designating information. If the user does not accept the alteration, the setting of the arrangement may be performed anew. Namely, a state prior to the instruction of arrangement determination being provided from arrangement determination unit 112 may be restored, so that the setting of the arrangement can be performed again.

It is also possible that alteration unit 118 performs alteration without waiting for acceptance by a user, and notification unit 119 may or may not notify that the alteration has been performed. In such a case, alteration unit 118 may perform alteration in one of the following modes.

In a first mode, when there is a candidate for alteration, the alteration is performed automatically.

In a second mode, when there is a candidate for alteration and an amount of data of an archive file (or an amount of data of a control program and image data) that would be generated if the alteration were not performed exceeds a predetermined amount of data (hereinafter, "upper limit"), the alteration is performed. If there are plural candidates for alteration, the alteration may be performed for each candidate for alteration, or for some of the candidates for alteration, so long as an amount of data of the resulting archive file does not exceed the upper limit Candidates for which alteration is performed may be selected by an operation of operation unit 13 performed by a user after notification unit 119 notifies the user of the candidates for alteration.

Also, in a case where the amount of data of the generated archive file exceeds the upper limit even when the alteration is performed for all the candidates for alteration, a range of the close relationship may be widened to increase a number of candidates for alteration.

In the first described embodiment, a control program and an archive file corresponding to mobile terminal 30 of a pre-designated model are generated. However, control programs and archive files for multiple models may be generated at the same time. In such a case, generating device 10 should be adapted to allow for designation of multiple models, and each unit in the program generation function should be adapted to execute the processes for the multiple models, i.e., for sets of font identity information, in parallel.

In the first described embodiment, mobile terminal 30 downloads an archive file to execute a control program. However, the present invention is not limited to a mobile terminal such as a mobile phone, a PDA, or the like, but may be applied to any display device having a display screen, such as a television, a personal computer, or the like. Namely, mobile terminal 30 is an example of a display device. It is to be noted that, in case of a personal computer or the like, if a monitor providing a display screen is a separate member from the computer itself, so long as the content displayed on the monitor is controlled by the computer, it is considered that the computer and the monitor in combination constitute a display device.

In the first described embodiment, explanation is given with the characters being letters of the alphabet. However, the characters may be any character used in any language, such as for example, Japanese (kanji, hiragana, or katakana).

The generation program in the first described embodiment may be provided in a state stored in a computer-readable storage medium such as a magnetic storage medium (a magnetic tape, a magnetic disk, or the like), an optical storage medium (an optical disk, or the like), a magneto-optical storage medium, a semiconductor memory, and so on. The program also may be downloaded via a network.

What is claimed is:

1. A program generation device that generates a control program for controlling content displayed on a display screen of a display device that stores font data for generating character image data representing an image of a character indicated by character information in accordance with a font identity indicated by font information, the program generation device comprising:

an acquisition unit that acquires one or more font identities supported by the font data stored in the display device;

a designation unit that designates characters for constituting the displayed content, font identities for the characters, and display positions of the characters;

an arrangement-designating information generation unit that generates arrangement-designating information including character information that indicates the characters designated by the designation unit, font information that indicates the font identities for the characters, and position information that indicates the display positions of the characters;

an image data generation unit that, based on an item of character information in the arrangement-designating information that indicates a character associated with a font identity other than the one or more font identities acquired by the acquisition unit, and an item of font information that indicates the font identity for the character, generates an item of image data representing an image that depicts the character according to its font identity;

a display-designating information generation unit that generates display-designating information by replacing the item of character information and the item of font information in the arrangement-designating information that relate to the character and the font identity used in the generation of the item of image data by the image data generation unit with image-specifying information that specifies the item of image data, such that the display-designating information includes the image-specifying information and position information indicating a display position of the image relating to the image-specifying information as well as items of character information, items of font information, and items of position information in the arrangement-designating information that relate to characters for which the replacement is not performed;

a program generation unit that generates a control program for causing the display device to implement a function of causing the display screen of the display device to display an image representing a character indicated by each item of character information in the display-designating information according to the font identity indicated by the related item of font information and an image represented by the item of image data specified by the image-specifying information, at respective display positions in accordance with the display-designating information; and an alteration unit that, with regard to a character associated with a font identity that is different from and is in a predetermined relationship with one of the one or more font identities acquired by the acquisition unit, performs alteration by replacing an item of font information in the arrangement-designating information that indicates the font identity of the character with an item of font information indicating the one of the one or more acquired font identities, wherein the image data generation unit generates, based on an item of character information in the altered arrangement-designating information that indicates a character associated with a font identity other than the one or more font identities acquired by the acquisition unit, and an item of font information that indicates the font identity for the character, generates an item of image data representing an image that depicts the character according to the font identity, and wherein the alteration unit performs the alteration of an item of font information in a case where, if the control program is generated by the program generation unit and the item of image data is generated by the image data generation unit, an amount of data of the control program and the item of image data would exceed a predetermined amount of data.

2. The program generation device according to claim 1, wherein the alteration unit widens a range for a character associated with a font identity that is different from and is in a predetermined relationship with the one or more font identities acquired by the acquisition unit in a case where, if the control program is generated by the program generation unit and the item of image data is generated by the image data generation unit, an amount of data of the control program and the item of image data would exceed a predetermined amount of data.

3. The program generation device according to claim 1, further comprising a notification unit that, when there is an item of font information altered by the alteration unit, notifies the alteration.

4. The program generation device according to claim 1, further comprising:
   a storage unit that stores a correspondence table in which the one or more font identities supported by the font data stored in the display device are associated with the display device; and
   a specifying unit that specifies the display device,
   wherein the acquisition unit refers to the correspondence table to acquire the one or more font identities corresponding to the specified display device.

5. A non-transitory computer-readable storage medium storing a program for causing a computer to generate a control program for controlling content displayed on a display screen of a display device that stores font data for generating character image data representing an image of a character indicated by character information in accordance with a font identity indicated by font information, the program causing the computer to function as:
   an acquisition unit that acquires one or more font identities supported by the font data stored in the display device;
   a designation unit that designates characters for constituting the displayed content, font identities for the characters, and display positions of the characters;
   an arrangement-designating information generation unit that generates arrangement-designating information including character information that indicates the characters designated by the designation unit, font information that indicates the font identities for the characters, and position information that indicates the display positions of the characters;
   an image data generation unit that, based on an item of character information in the arrangement-designating information that indicates a character associated with a font identity other than the one or more font identities acquired by the acquisition unit, and an item of font information that indicates the font identity for the character, generates an item of image data representing an image that depicts the character according to its font identity;
   a display-designating information generation unit that generates display-designating information by replacing the item of character information and the item of font information in the arrangement-designating information that relate to the character and the font identity used in the generation of the item of image data by the image data generation unit with image-specifying information that specifies the item of image data, such that the display-designating information includes the image-specifying information and position information indicating a display position of the image relating to the image-specifying information as well as items of character information, items of font information, and items of position information in the arrangement-designating information that relate to characters for which the replacement is not performed;
   a program generation unit that generates a control program for causing the display device to implement a function of causing the display screen of the display device to display an image representing a character indicated by each item of character information in the display-designating information according to the related font identity and an image represented by the item of image data specified by the image-specifying information, at respective display positions in accordance with the display-designating information; and
   an alteration unit that, with regard to a character associated with a font identity that is different from and is in a predetermined relationship with one of the one or more font identities acquired by the acquisition unit, performs alteration by replacing an item of font information in the arrangement-designating information that indicates the font identity of the character with an item of font information indicating the one of the one or more acquired font identities,
   wherein the image data generation unit generates, based on an item of character information in the altered arrangement-designating information that indicates a character associated with a font identity other than the one or more font identities acquired by the acquisition unit, and an item of font information that indicates the font identity for the character, generates an item of image data representing an image that depicts the character according to the font identity, and
   wherein the alteration unit performs the alteration of an item of font information in a case where, if the control program is generated by the program generation unit and the item of image data is generated by the image data generation unit, an amount of data of the control program and the item of image data would exceed a predetermined amount of data.

6. A program generation method of generating a control program for controlling content displayed on a display screen of a display device that stores font data for generating character image data representing an image of a character indicated by character information in accordance with a font identity indicated by font information, the method comprising the steps of:

acquiring one or more font identities supported by the font data stored in the display device;

designating characters for constituting the displayed content, font identities for the characters, and display positions of the characters;

generating arrangement-designating information including character information that indicates the characters designated by the designation step, font information that indicates the font identities for the characters, and position information that indicates the display positions of the characters;

generating, based on an item of character information in the arrangement-designating information that indicates a character associated with a font identity other than the one or more font identities acquired by the acquisition step, and an item of font information that indicates the font identity for the character, an item of image data representing an image that depicts the character according to its font identity;

generating display-designating information by replacing the item of character information and the item of font information in the arrangement-designating information that relate to the character and the font identity used in the generation of the item of image data by the image data generation step with image-specifying information that specifies the item of image data, such that the display-designating information includes the image-specifying information and position information indicating a display position of the image relating to the image-specifying information as well as items of character information, items of font information, and items of position information in the arrangement-designating information that relate to characters for which the replacement is not performed;

generating a control program for causing the display device to implement a function of causing the display screen of the display device to display an image representing a character indicated by each item of character information in the display-designating information according to the related font identity and an image represented by the item of image data specified by the image-specifying information, at respective display positions in accordance with the display-designating information;

performing alteration, with regard to a character associated with a font identity that is different from and is in a predetermined relationship with one of the one or more acquired font identities, by replacing an item of font information in the arrangement-designating information that indicates the font identity of the character with an item of font information indicating the one of the one or more acquired font identities; and generating, based on an item of character information in the altered arrangement-designating information that indicates a character associated with a font identity other than the one or more acquired font identities, and an item of font information that indicates the font identity for the character, an item of image data representing an image that depicts the character according to the font identity, wherein the alteration of an item of font information is performed in a case where, if the control program is generated and the item of image data is generated, an amount of data of the control program and the item of image data would exceed a predetermined amount of data.

* * * * *